(12) United States Patent
Chettimada et al.

(10) Patent No.: US 9,003,089 B2
(45) Date of Patent: Apr. 7, 2015

(54) SYNCHRONOUS SERIAL DATA-EXCHANGE SYSTEM

(75) Inventors: Vinayak Kariappa Chettimada, Trondheim (NO); Bjorn Tore Taraldsen, Tiller (NO); Per Carsten Skoglund, Melhus (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 13/985,715

(22) PCT Filed: Feb. 14, 2012

(86) PCT No.: PCT/GB2012/050324
§ 371 (c)(1),
(2), (4) Date: Oct. 29, 2013

(87) PCT Pub. No.: WO2012/110798
PCT Pub. Date: Aug. 23, 2012

(65) Prior Publication Data
US 2014/0143461 A1    May 22, 2014

(30) Foreign Application Priority Data
Feb. 15, 2011    (GB) .................................. 1102594.7

(51) Int. Cl.
*G06F 13/42*    (2006.01)
*G06F 13/362*    (2006.01)

(52) U.S. Cl.
CPC ........ *G06F 13/4286* (2013.01); *G06F 13/4282* (2013.01); *G06F 13/4291* (2013.01); *G06F 13/362* (2013.01)

(58) Field of Classification Search
CPC ......................... G06F 13/4282; G06F 13/4286
USPC ......................... 710/105, 106, 110
See application file for complete search history.

(56) References Cited

U.S. PATENT DOCUMENTS

2005/0215248 A1* 9/2005 Brookshire ................ 455/426.1
2006/0143348 A1* 6/2006 Wilson et al. ................. 710/110
(Continued)

FOREIGN PATENT DOCUMENTS

CN    101552733 A1    10/2009
EP        1748364 A1     1/2007
(Continued)

OTHER PUBLICATIONS

UK Examination Report for Application No. GB1202504.5 (Priority Feb. 15, 2011) dated May 23, 2013.
UK Office Action, Report of telephone conversation between Tim Wilson and Examiner Dr. Stephen Richardson held 3 & 4 Sep. 2013 from Application No. GB1202504.5 (Priority Feb. 15, 2011) dated Sep. 6, 2013.
Notification of Transmittal of International Search Report and Written Opinion for PCT/GB2012/050324 dated Jun. 22, 2012.
US Publication No. 2006/143348 A1 (Wilson Mathew) published Jun. 29, 2006.

(Continued)

*Primary Examiner* — Glenn A Auve
(74) *Attorney, Agent, or Firm* — Koppel, Patrick, Heybl & Philpott

(57) ABSTRACT

A serial interface comprises a clock line, a request line, a ready line, a master-to-slave data line, and a slave-to-master data line. A master device transmits a clock signal to a slave device over the clock line. In a first transaction, the master device sends a master transmission request signal to the slave device over the request line; in response, the slave device sends a slave transmission accept signal over the ready line, which causes the master device to transmit binary data to the slave device over the master-to-slave data line. In a second transaction, the slave device sends a slave transmission request signal over the ready line; in response, the master device sends a master transmission accept signal over the request line, which causes the slave device to transmit binary data to the master device over the slave-to-master data line. In at least one of the transactions, the master and slave devices transmit binary data at the same time as each other.

15 Claims, 2 Drawing Sheets

(56) References Cited

U.S. PATENT DOCUMENTS

2010/0131676 A1* 5/2010 Escamilla ..................... 710/4
2013/0212311 A1* 8/2013 Hunsaker et al. ............. 710/110

FOREIGN PATENT DOCUMENTS

GB         2488223     1/2014
JP         H0546549 A     2/1993

OTHER PUBLICATIONS

US Publication No. 2007/061342 A1 (Magdeburger Thomas) published Mar. 15, 2007.

"M68HC11 Reference Manual (Chapter SPI)", May 31, 2007, pp. 291-316 XP55029150 http://www.freescale.com/files/microcontrollers/doc/ref_manual/M68HC11RM.pdf (retrieved on Jun. 6, 2012).

* cited by examiner

SYNCHRONOUS SERIAL DATA-EXCHANGE SYSTEM

This invention relates to a serial interface.

Serial interfaces are commonly used to allow one electrical component or device to communicate binary data to another, one bit at a time. For example, a microcontroller unit (MCU) and a radio chip mounted on a printed circuit board (PCB) may use a serial interface comprising tracks on the PCB to communicate data between each other. The use of a serial bus, rather than a parallel bus, in such a situation can be desirable as it does not require a large number of pins on the integrated-circuits, thereby saving space.

One common serial interface is the Serial Peripheral Interface (SR). This provides synchronous communication between a master device and a slave device. It uses a clock line, over which the master device can transmit a clock signal, and two data lines, one for each direction of data flow. Data exchange is synchronised by the clock signal.

A problem with SPI is that it provides no mechanism whereby a slave device can initiate communication with the master device.

The present invention seeks to provide a serial interface which mitigates this shortcoming.

From one aspect, the invention provides a method of full-duplex communication between a master device and a slave device over a serial interface comprising five separate lines, being a clock line, a request line, a ready line, a master-to-slave data line, and a slave-to-master data line, the method comprising:
  the master device transmitting a clock signal to the slave device over the clock line;
  in a first transaction, the master device sending a master transmission request signal to the slave device over the request line; the slave device receiving the master transmission request signal and, in response, sending a slave transmission accept signal to the master device over the ready line; the master device receiving the slave transmission accept signal and, in direct response, transmitting binary data to the slave device over the master-to-slave data line; and
  in a second transaction, the slave device sending a slave transmission request signal to the master device over the ready line or over a slave-request line; the master device receiving the slave transmission request signal and, in response, sending a master transmission accept signal to the slave device over the request line or over a master-ready line; the slave device receiving the master transmission accept signal and, in direct response, transmitting binary data to the master device over the slave-to-master data line; wherein, in at least one of the first and second transactions, the master device transmits data over the master-to-slave at the same time as the slave device transmits binary data over the slave-to-master data line.

Thus it will be appreciated by those skilled in the art that a serial interface in accordance with the invention can allow either the slave device or the master device to initiate communication, while avoiding conflicts as to which is first to initiate the communication, and while supporting full-duplex communication between the two devices (i.e. simultaneous data flow in both directions).

Such an arrangement allows for the efficient flow of data in either or both directions, without, for example, the slave having to await a poll command from the master device before being able to send data. This can therefore result in faster response times by the master (or slave) device when an event occurs at the slave (or master) device.

If, for example, the slave device is an integrated radio transceiver, when the slave device receives a radio packet, it can at once indicate its desire to convey the contents of the received packet to an MCU (master device), and can start transmitting the contents to the MCU as soon as the MCU acknowledges the slave transmission request signal, without needing to wait to be polled by the MCU.

From a second aspect, the invention provides a communication system comprising a master device, a slave device and a serial interface, wherein the serial interface comprises five separate lines, being a clock line, a request line, a ready line, a master-to-slave data line, and a slave-to-master data line, wherein:
  the master device is configured to transmit a clock signal to the slave device over the clock line;
  the master device is configured, in a first transaction, to send a master transmission request signal to the slave device over the request line; the slave device is configured to receive the master transmission request signal and, in response, to send a slave transmission accept signal to the master device over the ready line; the master device is further configured to receive the slave transmission accept signal and, in direct response, to transmit binary data to the slave device over the master-to-slave data line;
  the slave device is configured, in a second transaction, to send a slave transmission request signal to the master device over the ready line or over a slave-request line; the master device is configured to receive the slave transmission request signal and, in response, to send a master transmission accept signal to the slave device over the request line or over a master-ready line; the slave device is further configured to receive the master transmission accept signal and, in direct response, to transmit binary data to the master device over the slave-to-master data line; and
  the master device and slave device are capable of transmitting binary data at the same time as each other in at least one of the first and second transactions.

From a further aspect, the invention provides a master device comprising five serial interface connections, being a clock connection, a request connection, a ready connection, a master-to-slave data connection, and a slave-to-master data connection, wherein:
  the master device is configured to transmit a clock signal to a slave device from the clock connection;
  the master device is configured, in a first transaction, to send a master transmission request signal to the slave device from the request connection; and to receive a slave transmission accept signal from the slave device at the ready connection and, in direct response, to transmit binary data to the slave device from the master-to-slave data connection;
  the master device is configured, in a second transaction, to receive a slave transmission request signal from the slave device at the ready connection or at a slave-request connection, and, in response, to send a master transmission accept signal to the slave device from the request connection or from a master-ready connection; and to receive binary data from the slave device at the slave-to-master data connection; and
  the master device is capable of transmitting binary data from the master-to-slave data connection at the same time as receiving binary data at the slave-to-master data connection, in at least one of the first and second transactions.

From a still further aspect, the invention provides a slave device comprising five serial interface connections, being a clock connection, a request connection, a ready connection, a master-to-slave data connection, and a slave-to-master data connection, wherein:

the slave device is configured to receive a clock signal from a master device at the clock connection;

the slave device is configured, in a first transaction, to receive a master transmission request signal from the master device at the request line and, in response, to send a slave transmission accept signal to the master device from the ready connection; and to receive binary data from the master device at the master-to-slave data connection;

the slave device is configured, in a second transaction, to send a slave transmission request signal to the master device from the ready connection or from a slave-request connection; to receive a master transmission accept signal from the master device at the request connection or at a master-ready connection and, in direct response, to transmit binary data to the master device from the slave-to-master data line; and the slave device is capable of receiving binary data at the master-to-slave data connection at the same time as transmitting binary data from the slave-to-master data connection, in at least one of the first and second transactions.

The clock connection (e.g. a pin) may be connected to a clock line (e.g. a PCB track). Similarly any or all of the request connection, ready connection, master-to-slave data connection and slave-to-master data connection may be connected to respective lines. If present, the slave-request connection may be connected to a slave-request line, and the master-response connection may be connected to a master-response line.

The clock connection, master-to-slave data connection and slave-to-master data connection may be connected to an SPI bus.

The master device preferably maintains the request line at one of two possible states. For convenience, these will be referred to as high and low states. They may correspond to high and low voltages, or to low and high voltages, respectively. The master transmission request signal may comprise a toggling of the state of the request line. In some embodiments, the master transmission request signal comprises lowering the request line from high to low.

The slave device preferably maintains the ready line at one of two possible states. For convenience, these will be referred to as high and low states. They may correspond to high and low voltages, or to low and high voltages, respectively. The slave transmission accept signal may comprise a toggling of the state of the ready line. In some embodiments, the slave transmission accept signal comprises lowering the ready line from high to low.

The slave transmission request signal may comprise a toggling of the state of the ready line. In some embodiments, the slave transmission request signal comprises lowering the ready line from high to low.

The master transmission accept signal may comprise a toggling of the state of the request line. In some embodiments, the master transmission accept signal comprises lowering the request line from high to low.

The master-to-slave data line and slave-to-master data line may operate independently of each other, or the system may be configured so that both lines are active together. In the latter case, if only one of the devices has data to transmit, the other device may transmit null or dummy data (e.g. all zero bits).

The master device may be configured to transmit the clock signal only when transmitting and/or receiving binary data.

The master device may be configured so that, in some situations, it transmits a message to the slave device at the same time as the slave device transmits a message to the master device where the messages are not of the same length as each other. If the slave-to-master and master-to-slave data lines are always activated together, then the device which has the shorter message to send may append dummy or null data to the end of the shorter message, e.g. to make it equal to the length of the longer message.

A message may contain information relating to its length. The message may contain a length number which conveys the length of the whole message. For example, the first byte of the message may be the total number of bytes of the message or of a variable-length data portion of the message.

The master device may be configured to receive message-length information from the slave device over the slave-to-master data line and to use the message-length information to determine when to end a transaction. Preferably the master device is configured to end the transaction once the master device has both (i) received all the bits of any message the slave device is transmitting over the slave-to-master data line, and (ii) transmitted all the bits of any message it is transmitting over the master-to-slave data line.

In this way, it can be ensured that messages of different lengths can be exchanged simultaneously and completely, providing a robust and efficient communication mechanism.

This idea is new and inventive in its own right, and thus from a further aspect the invention provides a method of exchanging data between a master device and a slave device over a synchronous serial connection, comprising the slave device transmitting a binary message containing message-length information to the master device at the same time as the master device transmits a binary message to the slave device, wherein the master device sends a transmission end signal to the slave device once the master device has both (i) received a number of message bits from the slave device corresponding to the message-length information, and (ii) transmitted all the bits of the message the master device is transmitting to the slave device.

From a further aspect, the invention provides a data-exchange system comprising a master device, a slave device, and a synchronous serial connection therebetween, wherein the slave device is configured to transmit a binary message containing message-length information to the master device at the same time as the master device transmits a binary message to the slave device, and wherein the master device is configured to send a transmission end signal to the slave device once the master device has both (i) received a number of message bits from the slave device corresponding to the message-length information, and (ii) transmitted all the bits of a message the master device is transmitting to the slave device.

From a still further aspect, the invention provides a master device configured to receive a binary message from a slave device, over a synchronous serial connection, containing message-length information, and, at the same time, to transmit a binary message to the slave device over the synchronous serial connection; and further configured to send a transmission end signal to the slave device once the master device has both (i) received a number of message bits from the slave device corresponding to the message-length information, and (ii) transmitted all the bits of a message the master device is transmitting to the slave device.

Preferably the transmitting of both messages starts simultaneously, preferably with the least significant bit of each message being transmitted simultaneously at the first clock signal.

Optional features of the earlier aspects may be features of these aspects also.

In any of the foregoing aspects, a transaction (i.e. a period of continuous or sustained communication) may be ended by the master device sending a master transmission end signal to the slave device over the request line or over an end-signal line. Alternatively or additionally a transaction may be ended by the master device stopping sending a clock signal over the clock line.

A master transmission end signal may comprise a toggling of the state of the request line. In some embodiments, the master transmission end signal comprises raising the request line from low to high.

The slave device may be configured to toggle the state of the ready line in response to receiving a master transmission end signal. In some embodiments, the slave device raises the ready line from low to high in response to receiving a master transmission end signal.

The master device may be configured to check the state of the ready or request line (or both) before sending a master transmission request signal, and to send the master transmission request signal only if the state of the line satisfies a master transmission condition. The master transmission condition may be that the line is high.

Similarly the slave device may be configured to check the state of the ready or request line (or both) before sending a slave transmission request signal, and to send the slave transmission request signal only if the state of the line satisfies a slave transmission condition. The slave transmission condition may be that the line is high.

In this way, collisions between transmission requests from the slave device and the master device can be avoided, by ensuring a transmission request is not sent while a transaction is already underway.

The master device preferably comprises a transmit buffer and a receive buffer. These may be one and the same buffer (e.g. a single 8-bit buffer), in which case bits may be transmitted from one end of the buffer and received at the other end (a cyclic buffer). However, preferably, they are separate buffers.

The master device may comprise a plurality of transmit buffers and/or a plurality of receive buffers. A controller in the master device (which might comprise hardware logic or software) may be configured to select one of the buffers to be an active transmit buffer, and the active buffer may be used for the current or next transmit operation. An active receive buffer may be selected similarly.

In a similar way, the slave device may comprise a single transmit and receive buffer, but preferably comprises one or more transmit buffers and one or more separate receive buffers. The slave device may comprise a controller configured to select an active transmit and/or receive buffer.

The buffers on the master and slave devices may all be the same size (e.g. 8 bits, or a constant number of bytes), or they may be of different sizes.

The buffer(s) of the master and/or slave device may be implemented in hardware or software.

The slave device may be configured to request retransmission of a message from the master device if the slave device determines that the master device has ended the transaction before the complete message has been received by the slave device. For example, the message may contain message-length information and the slave device may be configured to use this information to determine whether a corresponding number of message bits has been received when the slave device receives a master transmission end signal. The retransmission request may be made using the ready line and/or the slave-to-master data line. For example, the slave device may send a slave transmission request signal over the ready line and then transmit a message to the master device which comprises a predetermined retransmission request.

The master device may be, or comprise, a microcontroller or central processor unit. The slave device may be, or comprise, a microcontroller or central processor unit. The present invention is particularly suited to software control of both the master and slave devices. However it is also envisaged that the slave device might be, or comprise, a hardware device, e.g. a connectivity chipset such as a radio-on-a-chip, or some other component not necessarily having a general-purpose processor.

The connection lines of the interface may take any suitable form. They may be optical, but are preferably electrical. A cable comprising at least five connection lines may connect between the master device and the slave device; however, in preferred embodiments, the connection lines are formed on a PCB. In other embodiments the master device and slave device may be integrated on a single silicon chip, and the connection lines may comprise conductors on the silicon chip.

Data bits are preferably transmitted at the same rate as the clock signal; i.e. one bit per clock pulse. Data may be transmitted and read on the rising or falling edge of the clock signal. In some embodiments, data is captured on the rising edge of the clock and transmitted on the falling edge.

Although the invention has been described with reference to a master device and one slave device, it will be appreciated that it may instead be used with one master device and a plurality of slave devices. A slave select line may connect the master device to the slave devices and may be used to select one of the slave devices to be active, as is known from SPI. If the lines are shared between all the slave devices, an inactive slave device may be configured to ignore signals on the request and master-to-slave data connection lines, and not to transmit any signals on the ready and slave-to-master data connection lines.

In some embodiments comprising a plurality of slave devices, each slave device can have its own ready line, and optionally its own request line, connecting with the master device. In this way, a slave device is able to send a slave transmission request signal to the master device even during a transaction between the master device and another slave device, and to await a master transmission accept signal. The clock line, master-to-slave data line and slave-to-master data lines may still be shared between a plurality of slave devices, thereby saving space compared with having entirely independent serial interfaces to each slave device.

Optional or preferred features of any of the aspects of the invention may be optional or preferred features of any of the other aspect, wherever appropriate. Some or all of the aspects may be combined in a single embodiment.

Certain preferred embodiments of the invention will now be described, by way of example only, with reference to the accompanying drawings, in which.

Figure 1:
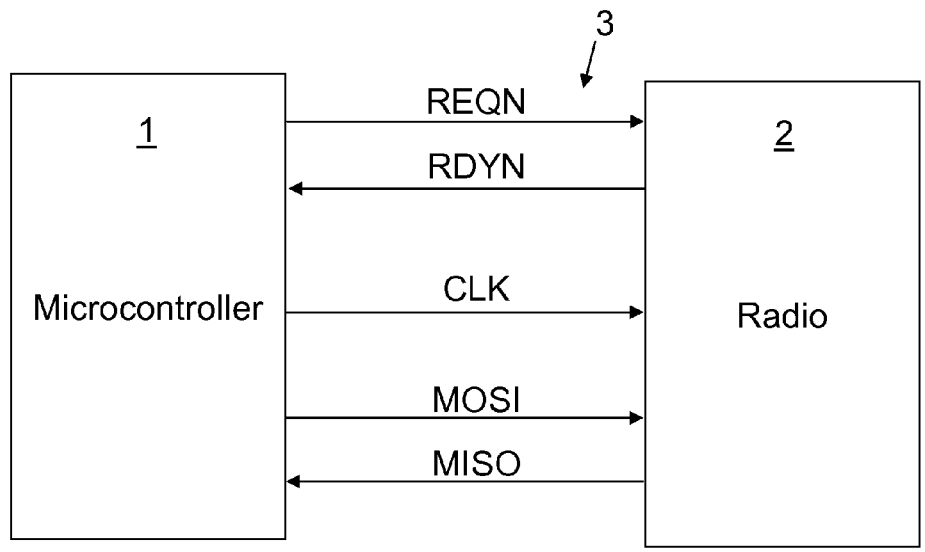
FIG. 1 is a schematic diagram showing a microcontroller (MCU), a radio transceiver and the serial connection between them.

FIG. 1 shows an MCU 1 and an integrated single-chip radio transceiver 2. These may be separate packages mounted on a common PCB, for example. The MCU 1 and radio have a five-line serial bus 3 between them, which may be formed from tracks on the PCB. The serial lines are: a request line (REQN), a ready line (RDYN), a clock line (CLK), a master-out slave-in data line (MOSI) and a master-in slave-out data line (MISO).

| Signal | MCU | Radio | Description |
| --- | --- | --- | --- |
| MISO | Input | Output | SPI: Master In Slave Out |
| MOSI | Output | Input | SPI: Master Out Slave In |
| CLK | Output | Input | SPI: Serial data Clock |
| REQN | Output | Input | MCU to radio handshake signal |
| RDYN | Input | Output | Radio to MCU handshake signal |

A software application running on the MCU 1 may use the serial connection to send data to the radio 2, such as commands and messages to be transmitted by the radio, and to receive data from the radio 2, such as status information and messages received by the radio.

Figure 2:
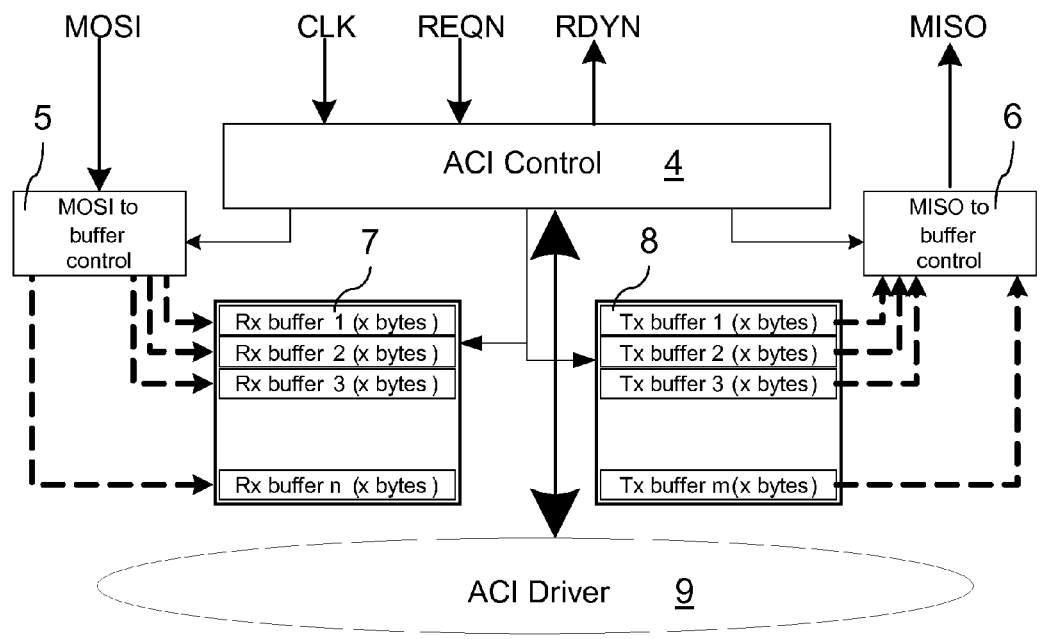
FIG. 2 is a schematic diagram showing internal components in the radio transceiver.

FIG. 2 shows certain components within the radio 2 which are used for controlling the serial interface.

The clock line, request line and ready line connect to an Application Controller Interface (ACI) control component 4. The master-out slave-in data line connects to a MOSI-to-buffer control component 5, while the master-in slave-out data line connects to a MISO-to-buffer control component 6. The MOSI-to-buffer control component 5 can write to any of n receive (RX) buffers 7. The MISO-to-buffer control component 6 can read from any of m transmit (TX) buffers 8. The numbers n and m may be equal or different. Each buffer is x bytes long. x is the maximum (fragmented) length for the implemented software protocol that will use ACI. In one example n=5, m=2 and x=32. In another example, n=m=10 and x=4. The ACI control component 4, buffer control components 5, 6 and RX and TX buffers 7, 8 are all implemented in hardware.

The ACI control component 4 has connections to the two buffer control components 5, 6, the RX buffers 7, the TX buffers 8, and an Application Controller Interface (ACI) driver component 9, which may be implemented in hardware or software. The ACI driver component 9 interfaces between the serial connection buffers and other components of the radio transceiver.

The MCU 1 may have a similar or identical arrangement to that shown in FIG. 2, albeit with the directions of each connection line reversed.

In use, the MCU 1 can request communication with the radio 2 by placing the REQN line to ground. The radio 2, if ready for communication, will place the RDYN line to ground; otherwise it will keep it high until it is ready. The MCU 1 starts data transmission once it sees the RDYN line is placed to ground.

The radio 2 can request communication with the MCU 1 by placing the RDYN line to ground. The MCU 1 responds by acknowledging by placing the REQN line to ground and starting the data transmission.

Data transmission is always coordinated by the MCU 1, which manages the clock signal on the CLK line.

When the radio 2 has lowered the RDYN line to ground to indicate its desire to transmit a message to the MCU 1, the radio 2 also places the least significant data bit of the message on the MISO line. If the MCU 1 also has data to send to the radio 2, it places the least significant data bit on the MOSI line and then raises the CLK line to high. The radio 2 receives the clock signal and reads the data bit from the MOSI line. At the same time, the MCU 1 reads the least significant data bit from the MISO line.

The MCU 1 then lowers the CLK line to ground and places the second-to-least significant data bit on the MOSI line. The slave shifts the read data bit into an active RX buffer and places the second-to-least significant data bit on the MISO line.

This process continues until the required number of data bits (e.g. the entirety of both messages) has been transmitted in both directions.

Each data bit is transmitted on the falling edge of the clock and captured on the rising edge of the clock.

The ACI control component 4 handles flow control, negotiation, asymmetric data transmission and retransmission. It also supervises the buffer control components 5, 6 in connection with retransmission.

The ACI control component 4 is able to acknowledge on the RDYN line when the radio 2 is ready to receive a data transmission requested by the MCU 1. It can also indicate on the RDYN line when it has a request for the MCU 1 to initiate a data transmission when the radio 2 has data to transmit.

For asymmetric data transmission, the ACI control component 4 has independent buffer control components 5, 6 for the MOSI line and the MISO line. If the ACI control component 4 detects a successful, complete transmission and/or reception, then it causes the MOSI buffer control component 5 to advance to the next receive and/or transmission buffer as the active buffer.

The ACI control component 4 checks with the MOSI and MISO buffer control components 5, 6 before sending a signal on the RDYN line to ensure that sufficient buffer space is available in either or both directions.

The buffer control components 5, 6 play the role of independent shift logic during data transmission. The ACI control component 4 indicates from or to which buffer the shift or capture of data bits will occur.

The ACI driver component 9 has access to the ACI control component 4 and handles all incoming and outgoing data transmissions as requested by the MCU 1 and the radio chip 2.

Figure 3:
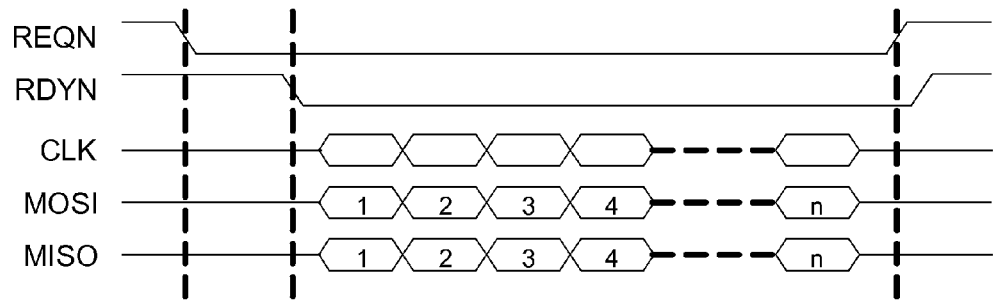
FIG. 3 is a timing diagram showing a transaction initiated by the MCU.

FIG. 3 shows the timing for a packet sent from the MCU 1 to the radio 2, relating to the following sequence of events:

the MCU 1 requests the right to send data by setting the REQN pin to ground;

the radio chip 2 sets the RDYN pin to ground when it approves the request from the MCU 1 to begin transmitting data;

the MCU 1 starts sending a clock signal on the CLK pin and starts transmitting data from the MOSI pin. The first byte from the MCU 1 defines the length of the message. The second byte is the first byte of the message data. The nth byte is the last byte of the message data;

the MCU 1 stops the clock and sets the REQN pin high to terminate the data transaction; and the radio 2 reset the RDYN pin to high.

If the radio 2 has data waiting to be sent to the MCU 1, it can transmit this concurrently with the transmission from the MCU 1.

Figure 4:
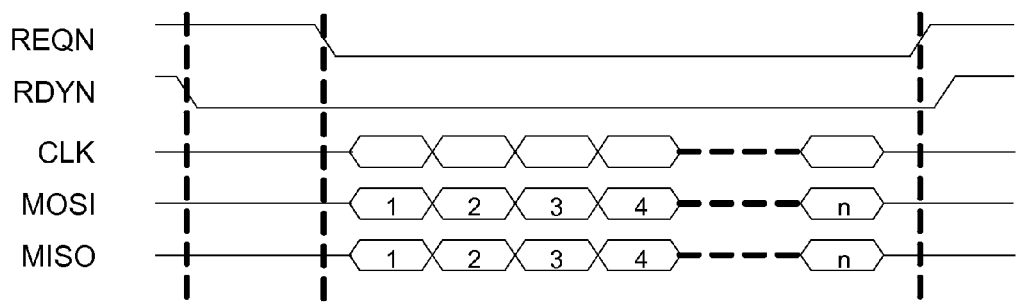
FIG. 4 is a timing diagram showing a transaction initiated by the radio.

FIG. 4 shows the timing for a packet sent from the radio 2 to the MCU 1, relating to the following sequence of events:

- the radio chip 2 sets the RDYN pin to ground;
- the MCU 1 sets the REQN pin to ground, starts sending a clock signal on the CLK pin, and starts fetching data at the MOSI pin. The first byte from the radio 2 is an internal debug byte which the MCU 1 discards. The second byte defines the length of the message. The third byte is the first byte of the message data. The nth byte is the last byte of the message data;
- once the MCU 1 has received the whole message, it stops the clock and sets the REQN pin high to terminate the data transaction; and
- the radio 2 reset the RDYN pin to high.

If the MCU 1 has data waiting to be sent to the radio 2, it can transmit this concurrently with the transmission from the radio 2.

The maximum length of a packet can be decided in the implementation based on the buffer size available.

Using the REQN, RDYN, CLK, MOSI and MISO lines, the MCU 1 and radio 2 can receive and transmit data in full duplex mode.

Having the length of the message embedded in the transmission data allows the MCU 1 to clock the maximum of the lengths of concurrently-transmitted messages, thereby ensuring all data bits reach the radio 2 and the MCU 1.

If the MCU 1 does not clock all the expected data bits, according to the embedded length of the transmission, the ACI control component 4 (and/or optionally higher level software) can detect an incomplete transmission. This can cause the radio 2 to request a retransmission.

Error detection may be implemented at a higher protocol level.

The invention claimed is:

1. A data-exchange system comprising a master device, a slave device, and a synchronous serial connection therebetween,
   wherein the slave device is configured to transmit a slave-to-master binary message, containing data and message-length information relating to the length of the slave-to-master binary message, to the master device at the same time as the master device transmits a master-to-slave binary message, containing data, to the slave device, and wherein the master device is configured to:
   determine once the master device has both (i) received a number of message bits from the slave device corresponding to the message-length information, and (ii) transmitted all the bits of the master-to-slave binary message; and
   send a transmission end signal to the slave device in response to this determination.

2. The data-exchange system of claim 1, configured to start the transmission of both messages simultaneously.

3. The data-exchange system of claim 1, wherein the serial connection comprises five separate lines, being a clock line, a request line, a ready line, a master-to-slave data line, and a slave-to-master data line, and wherein the master device is configured:
   to transmit a clock signal to the slave device over the clock line; and
   to send a master transmission request signal to the slave device over the request line, to receive a slave transmission accept signal from the slave device over the ready line and, in direct response, to transmit said master-to-slave binary message containing data to the slave device over the master-to-slave data line.

4. The data-exchange system of claim 1, wherein the serial connection comprises five separate lines, being a clock line, a request line, a ready line, a master-to-slave data line, and a slave-to-master data line, and wherein the slave device is configured:
   to receive a clock signal from the master device over the clock line; and
   to send a slave transmission request signal to the master device over the ready line or over a slave-request line, to receive a master transmission accept signal from the master device over the request line or over a master-ready line and, in direct response, to transmit said slave-to-master binary message containing data and message-length information to the master device over the slave-to-master data line.

5. The data-exchange system of claim 1, wherein the master device is configured to use the received message-length information to determine when to end the transaction.

6. The data-exchange system of claim 1, wherein the master-to-slave binary message contains information related to its length.

7. The data-exchange system of claim 6, wherein the slave device is configured to use message-length information received from the master device to determine whether a corresponding number of master-to-slave message bits has been received when the slave device receives the transmission end signal.

8. The data-exchange system of claim 6, wherein the slave device is configured to request retransmission of the master-to-slave binary message from the master device if the slave device determines that the master device has ended the transaction before the complete master-to-slave binary message has been received by the slave device.

9. The data-exchange system of claim 1, wherein the serial connection comprises five separate lines, being a clock line, a request line, a ready line, a master-to-slave data line, and a slave-to-master data line, wherein:
   the master device is configured to transmit a clock signal to the slave device over the clock line;
   the master device is configured, in a first transaction, to send a master transmission request signal to the slave device over the request line; the slave device is configured to receive the master transmission request signal and, in response, to send a slave transmission accept signal to the master device over the ready line; the master device is further configured to receive the slave transmission accept signal and, in direct response, to transmit binary data to the slave device over the master-to-slave data line;
   the slave device is configured, in a second transaction, to send a slave transmission request signal to the master device over the ready line or over a slave-request line; the master device is configured to receive the slave transmission request signal and, in response, to send a master transmission accept signal to the slave device over the request line or over a master-ready line; the slave device is further configured to receive the master transmission accept signal and, in direct response, to transmit binary data to the master device over the slave-to-master data line; and
   the master device and slave device are capable of transmitting binary data at the same time as each other in at least one of the first and second transactions.

10. A master device configured to receive a slave-to-master binary message from a slave device, over a synchronous serial connection, containing data and message-length information relating to the length of the slave-to-master binary message, and, at the same time, to transmit a master-to-slave binary message, containing data, to the slave device over the synchronous serial connection; and further configured to:

determine once the master device has both (i) received a number of message bits from the slave device corresponding to the message-length information, and (ii) transmitted all the bits of the master-to-slave binary message; and send a transmission end signal to the slave device in response to this determination.

11. The master device of claim 10, wherein the master device comprises five serial interface connections, being a clock connection, a request connection, a ready connection, a master-to-slave data connection, and a slave-to-master data connection, and is configured:

to transmit a clock signal to the slave device over the clock line; and to send a master transmission request signal to the slave device from the request connection, to receive a slave transmission accept signal from the slave device at the ready connection and, in direct response, to transmit said master-to-slave binary message containing data to the slave device from the master-to-slave data connection.

12. The master device of claim 10, wherein the master device comprises five serial interface connections, being a clock connection, a request connection, a ready connection, a master-to-slave data connection, and a slave-to-master data connection, and is configured:

to transmit a clock signal to the slave device over the clock line; and to receive a slave transmission request signal from the slave device at the ready connection or at a slave-request connection, and, in response, to send a master transmission accept signal to the slave device from the request connection or from a master-ready connection; and to receive said slave-to-master binary message containing data and message-length information from the slave device at the slave-to-master data connection.

13. The master device of claim 10, wherein the master device is configured to use the received message-length information to determine when to end the transaction.

14. The master device of claim 10, wherein the master-to-slave binary message contains information related to its length.

15. The master device of claim 10, comprising five serial interface connections, being a clock connection, a request connection, a ready connection, a master-to-slave data connection, and a slave-to-master data connection, wherein the master device:

is configured to transmit a clock signal to the slave device from the clock connection;

is configured, in a first transaction, to send a master transmission request signal to the slave device from the request connection; and to receive a slave transmission accept signal from the slave device at the ready connection and, in direct response, to transmit binary data to the slave device from the master-to-slave data connection;

is configured, in a second transaction, to receive a slave transmission request signal from the slave device at the ready connection or at a slave-request connection, and, in response, to send a master transmission accept signal to the slave device from the request connection or from a master-ready connection;

and to receive binary data from the slave device at the slave-to-master data connection; and is capable of transmitting binary data from the master-to-slave data connection at the same time as receiving binary data at the slave-to-master data connection, in at least one of the first and second transactions.

* * * * *